United States Patent
Yamauchi

(10) Patent No.: US 9,491,476 B2
(45) Date of Patent: Nov. 8, 2016

(54) METHOD AND APPARATUS FOR DECIDING A VIDEO PREDICTION MODE

(71) Applicant: SAMSUNG ELECTRONICS CO., LTD., Suwon-si, Gyeonggi-do (KR)

(72) Inventor: Hideki Yamauchi, Seongnam-si (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 153 days.

(21) Appl. No.: 14/323,460

(22) Filed: Jul. 3, 2014

(65) Prior Publication Data
US 2015/0010070 A1   Jan. 8, 2015

(30) Foreign Application Priority Data
Jul. 5, 2013   (KR) .................. 10-2013-0079137

(51) Int. Cl.
| | |
|---|---|
| H04N 7/26 | (2006.01) |
| H04N 7/32 | (2006.01) |
| H04N 19/19 | (2014.01) |
| H04N 19/103 | (2014.01) |
| H04N 19/154 | (2014.01) |
| H04N 19/194 | (2014.01) |

(52) U.S. Cl.
CPC ............ *H04N 19/19* (2014.11); *H04N 19/103* (2014.11); *H04N 19/154* (2014.11); *H04N 19/194* (2014.11)

(58) Field of Classification Search
CPC .................. H04N 19/0003; H04N 19/00218; H04N 19/00351; H04N 19/00296; H04N 19/19; H04N 19/194
USPC ..................................... 375/240.12
See application file for complete search history.

(56) References Cited

U.S. PATENT DOCUMENTS

| | | | |
|---|---|---|---|
| 7,864,839 B2 | 1/2011 | Zhang et al. | |
| 8,208,548 B2 | 6/2012 | Nagaraj et al. | |
| 8,265,172 B2 | 9/2012 | Yang et al. | |
| 2006/0198439 A1 | 9/2006 | Zhu | |
| 2007/0068307 A1 | 3/2007 | Mann | |
| 2008/0008242 A1 | 1/2008 | Lu et al. | |
| 2008/0112481 A1 | 5/2008 | Hsaing et al. | |
| 2008/0181308 A1 | 7/2008 | Wang et al. | |
| 2008/0247462 A1* | 10/2008 | Demos ................. | H04N 19/597 375/240.03 |
| 2008/0253457 A1* | 10/2008 | Moore ................... | H04N 19/52 375/240.16 |
| 2009/0016443 A1 | 1/2009 | Kim et al. | |
| 2009/0067495 A1 | 3/2009 | Au et al. | |
| 2010/0091846 A1* | 4/2010 | Suzuki ................ | H04N 19/105 375/240.12 |
| 2011/0051801 A1 | 3/2011 | Hwang et al. | |
| 2011/0170591 A1 | 7/2011 | Li et al. | |
| 2011/0293002 A1 | 12/2011 | Sole et al. | |
| 2012/0328014 A1* | 12/2012 | Lim ...................... | H04N 19/61 375/240.12 |

FOREIGN PATENT DOCUMENTS

KR   10201100057794   6/2011

\* cited by examiner

*Primary Examiner* — Hee-Yong Kim
(74) *Attorney, Agent, or Firm* — F. Chau & Associates, LLC

(57) ABSTRACT

A method and an apparatus for deciding a video prediction mode are provided. The method includes providing n prediction modes, where n is a positive integer, selecting first prediction modes among the n prediction modes using a first cost function, and selecting a final prediction mode among the first prediction modes using a second cost function different from the first cost function. The first cost function includes a sum of absolute transformed difference (SATD) operation, and the second cost function includes a sum of squared difference (SSD) operation.

21 Claims, 10 Drawing Sheets

FIG. 1
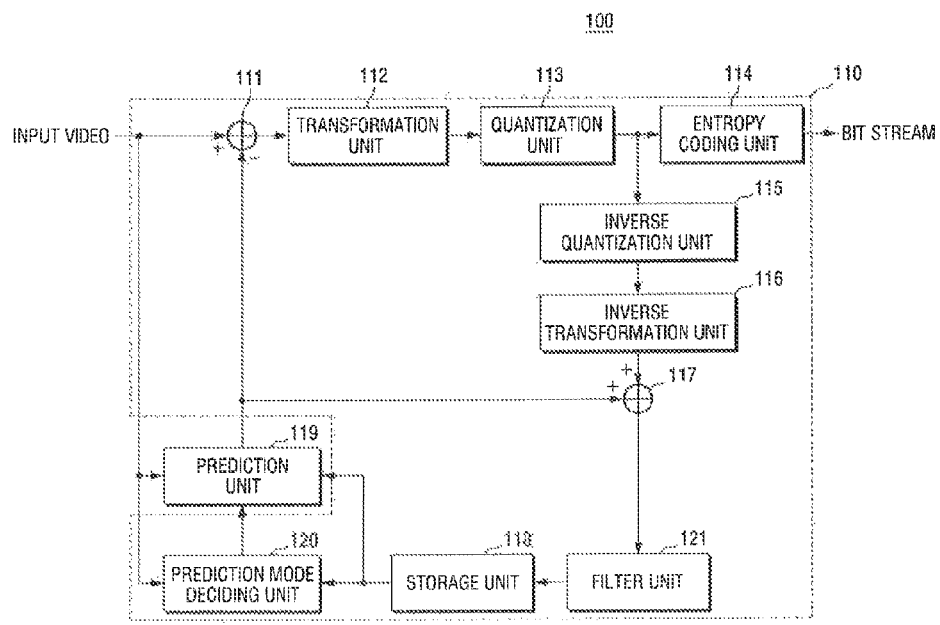
FIG. 2
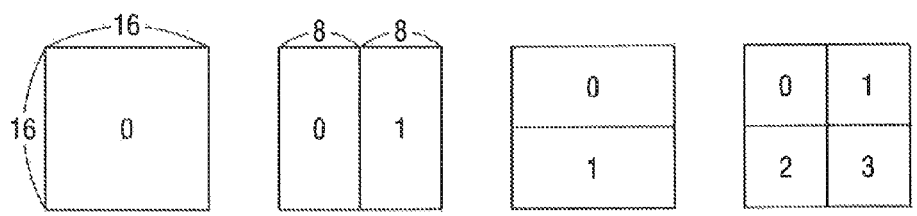
MACRO BLOCK PARTITIONS : 16x16, 16x8, 8x16, 8x8
8x8 BLOCK PARTITIONS : 8x8, 8x4, 4x8, 4x4

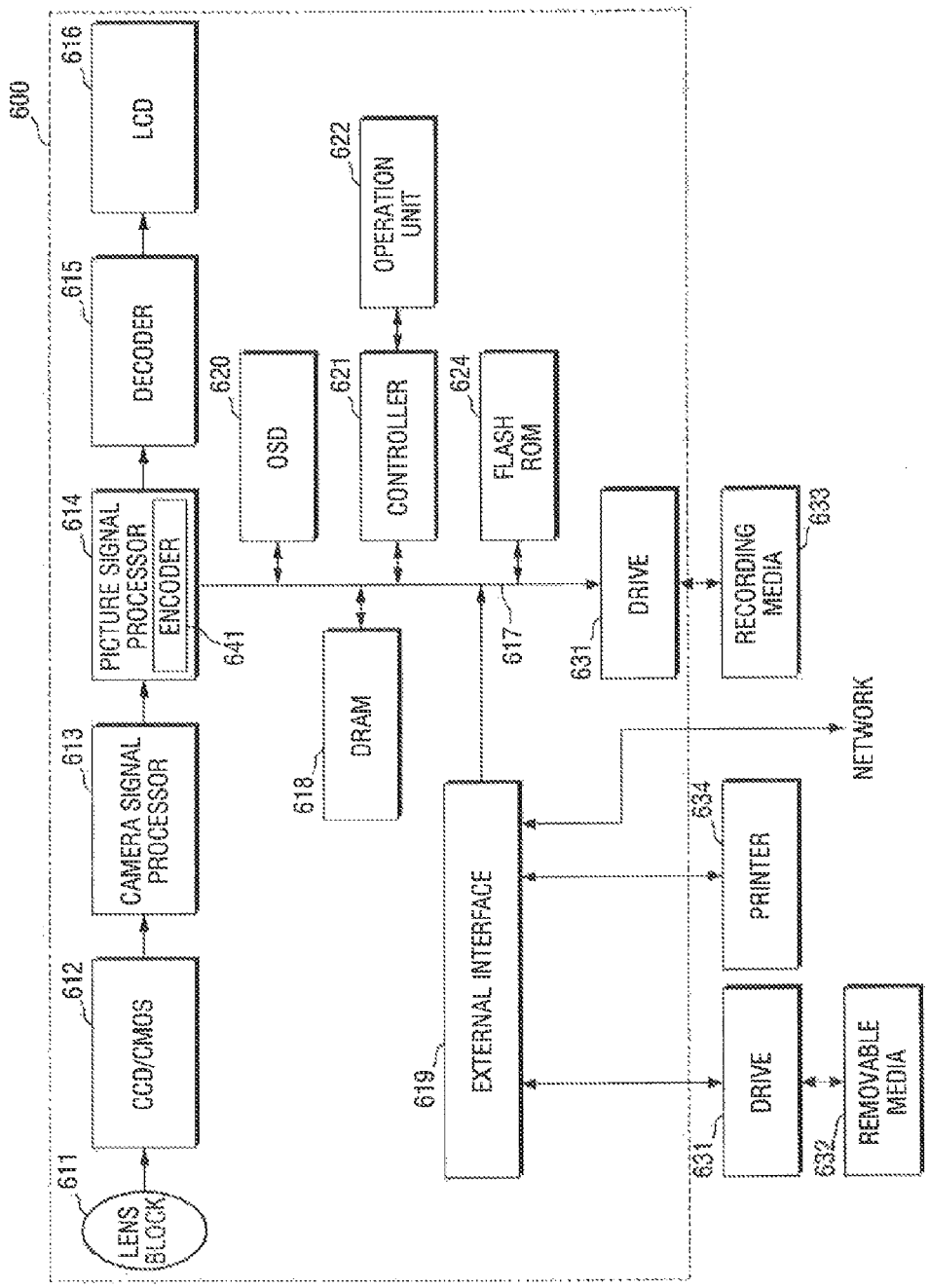

METHOD AND APPARATUS FOR DECIDING A VIDEO PREDICTION MODE

CROSS-REFERENCE TO RELATED PATENT APPLICATION

This application claims priority under 35 U.S.C. §119 to Korean Patent Application No. 10-2013-0079137 filed on Jul. 5, 2013 in the Korean Intellectual Property Office, and the disclosure of which is incorporated by reference herein.

TECHNICAL FIELD

The present inventive concept relates to a method and apparatus for deciding a video prediction mode.

DISCUSSION OF THE RELATED ART

In a video compression standard such as moving picture expert group (MPEG)-1, MPEG-2, MPEG-4, H.264/MPEG-4 advanced video coding (AVC), or high-efficiency video coding (HEVC), a picture is divided into unit blocks for video compression and encoding. After each of the unit blocks is encoded in each of the inter and intra prediction modes available, an appropriate prediction mode is selected according to the bit rate and differences between the original unit blocks and their adjacent unit blocks. Thus, each unit block is encoded in the selected prediction mode.

When a block of a current picture is encoded in the inter prediction mode, a motion vector indicating positions of reference blocks selected from reference pictures is generated and a differential pixel value between the reference block and the block to be encoded is then encoded. When a block of a current picture is encoded in the intra prediction mode, a prediction value of the block to be encoded is calculated using a pixel value that is spatially adjacent to the block to be encoded and a differential value between the prediction value and the pixel value is encoded.

SUMMARY

According to an aspect of the present inventive concept, a method of deciding a video prediction mode for video encoding is provided. The method includes providing n prediction modes, where n is a positive integer, selecting first prediction modes among the n prediction modes using a first cost function, and selecting a final prediction mode among the first prediction modes using a second cost function different from the first cost function. The first cost function includes a sum of absolute transformed difference (SATD) operation, and the second cost function includes a sum of squared difference (SSD) operation.

In an embodiment, the first cost function may be calculated by Equation (1):
Jfirst(mode)=SATD(mode)+Header_cost(mode) . . . (1),
where 'mode' is a prediction mode to be calculated among the n prediction modes, 'Jfirst' is the first cost function, and 'Header_cost' is an index value of the prediction mode to be calculated among the n prediction modes.

In an embodiment the second cost function may be calculated by Equation (2):
Jsecond(mode1)=$a$*SSD(mode1)+$b$*SATD(mode1)+Header_cost(mode1) . . . (2), where 'mode1' is a first prediction mode to be calculated among the first prediction modes, 'Jsecond' is the second cost function, 'Header_cost' is an index value of the first prediction mode to be calculated among the first prediction modes, '*' denotes multiplication, and 'a' and 'b' are transformation coefficients.

In an embodiment, a and b may be determined such that the second cost function is substantially the same as the sum of SSD(mode) and λ(mode)*R, where λ is a Lagrangian coefficient, R is a bit rate, 'mode' is a prediction mode to be calculated.

In an embodiment, the selecting of the first prediction mode may include obtaining first cost function values of the n prediction modes and selecting k prediction modes having small first cost function values among the n prediction modes as the first prediction modes, where k is a positive integer smaller than or equal to n (k≤n)

In an embodiment, the selecting of the first prediction modes may include obtaining a smallest prediction mode having a smallest first cost function value and selecting the k prediction modes having first cost function values within a critical range from the first cost function value of the smallest prediction mode value as the first prediction modes.

In an embodiment, the selecting of the final prediction mode may include obtaining second cost function values of the first prediction modes and selecting a first prediction mode having a smallest second cost function value among the first prediction modes as the final prediction mode.

In an embodiment, the n prediction modes may include an intra prediction mode or an inter prediction mode.

According to an aspect of the present inventive concept, a system on chip (SOC) including an apparatus for deciding a video prediction mode for video encoding is provided. The SOC includes an encoding unit and a prediction mode deciding unit. The encoding unit is configured to encode an input video signal and to generate a bit stream. The prediction mode deciding unit is configured to decide a final prediction mode used by the encoding unit. The final prediction mode is decided using a first cost function including a sum of absolute transformed difference (SATD) operation and a second cost function including a sum of squared difference (SSD) operation.

In an embodiment, the prediction mode deciding unit may include a first prediction mode deciding unit and a final prediction mode deciding unit. The first prediction mode deciding unit may be configured to select first prediction modes among n prediction modes using the first cost function. The final prediction mode deciding unit may be configured to select the final prediction mode among the first prediction modes using the second cost function.

According to an aspect of the present inventive concept, a prediction mode deciding apparatus is provided. The prediction mode deciding apparatus includes a first prediction mode deciding unit and a final prediction mode deciding unit. The first prediction mode deciding unit is configured to select first prediction modes among n prediction modes using a first cost function. The final prediction mode deciding unit is configured to select a final prediction mode among the first prediction modes using a second cost function. The first cost function includes a sum of absolute transformed difference (SATD) operation, the second cost function includes a sum of squared difference (SSD) operation, and n is a positive integer.

BRIEF DESCRIPTION OF THE DRAWINGS

The above and other features of the present inventive concept will become more apparent by describing in detail embodiments thereof with reference to the attached drawings in which:

FIG. 1 is a block diagram of a video prediction mode deciding apparatus according to an embodiment of the present inventive concept;

FIG. 2 is a reference diagram illustrating block prediction modes according to an embodiment of the present inventive concept;

FIG. 12 is a block diagram illustrating an example of main structures of a camera, according to an embodiment of the present inventive concept.

DETAILED DESCRIPTION OF THE EMBODIMENTS

Figure 3:
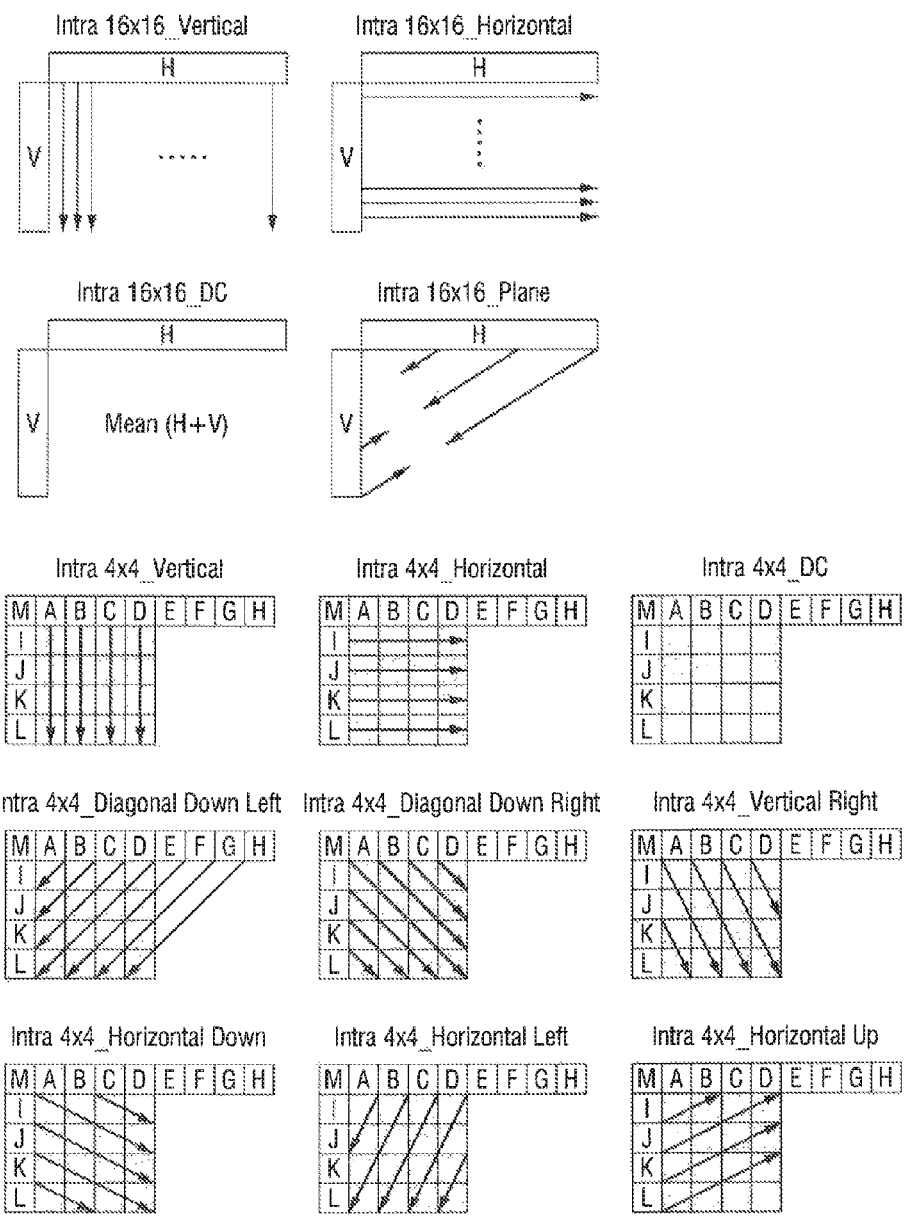
FIG. 3 illustrates examples of intra prediction modes of 16×16 and 4×4 pixel units.

The present inventive concept will now be described in more detail hereinafter with reference to the accompanying drawings, in which embodiments of the present inventive concept are shown. The present inventive concept may, however, be embodied in different forms and should not be construed as limited to the embodiments set forth herein. Rather, these embodiments are provided so that this disclosure will be thorough and complete, and will fully convey the scope of the inventive concept. The same reference numbers may refer the same elements throughout the specification. In the drawings, thickness of layers and regions may be exaggerated for clarity.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present inventive concept.

The term "unit" or "module", as used herein, means, but is not limited to, a software or hardware component, such as a field programmable gate array (FPGA) or an application specific integrated circuit (ASIC), which performs certain tasks. A unit or module may be configured to reside in the addressable storage medium and configured to execute on one or more processors. Thus, a unit or module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units or modules may be combined into fewer components and units or modules or further separated into additional components and units or modules.

Hereinafter, a video prediction mode deciding apparatus according to an embodiment of the present inventive concept will be described with reference to FIGS. 1 to 4.

Figure 4:
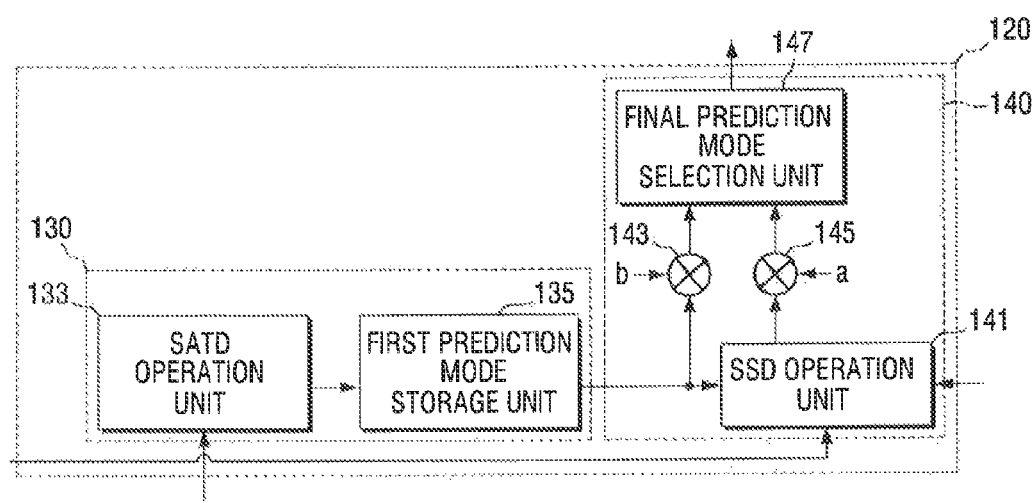
FIG. 4 is a detailed block diagram illustrating a prediction mode deciding unit of FIG. 1.

FIG. 1 is a block diagram of a video prediction mode deciding apparatus according to an embodiment of the present inventive concept, FIG. 2 is a reference diagram illustrating block prediction modes according to an embodiment of the present inventive concept, FIG. 3 illustrates examples of intra prediction modes of 16×16 and 4×4 pixel units, and FIG. 4 is a detailed block diagram illustrating a prediction mode deciding unit of FIG. 1.

Referring to FIG. 1, the video prediction mode deciding apparatus 100 includes an encoding unit 110 and a prediction mode deciding unit 120.

The video prediction mode deciding apparatus 100 is incorporated into a system on chip (SOC). In other words, the video prediction mode deciding apparatus 100 may operate as one of devices constituting the SOC.

The encoding unit 110 includes a subtractor 111, a transformation unit 112, a quantization unit 113, an entropy coding unit 114, an inverse quantization unit 115, an inverse transformation unit 116, an adder 117, a storage unit 118, and a prediction unit 119. The encoding unit 110 divides an input video into unit blocks, performs intra prediction and inter prediction on the respective unit blocks to generate a predicted video, transforms, quantizes, and entropy-codes a difference between the predicted video and the input video to generate a bit stream.

Referring first to FIG. 2, a block may be partitioned into sub blocks having various sizes of 16×16, 16×8, 8×16, 8×8, 8×4, 4×8, and 4×4 to be encoded. Each block is encoded by adopting various prediction modes available in inter prediction and/or intra prediction, and a prediction mode having a minimum cost (e.g., a minimum rate-distortion cost) is decided as the final prediction mode of the block among the various prediction modes. The minimum cost may be calculated with respect to bit streams generated according to prediction modes. For example, in the intra prediction mode, a block may be predicatively encoded using an intra 16×16 mode and/or an intra 4×4 mode, and in inter prediction mode, a block may be encoded using an inter prediction mode selected among an inter 16×16 mode, an inter 16×8 mode, an inter 8×16 mode, an inter 8×8 mode, an inter 8×4 mode, an inter 4×8 mode, and/or an inter 4×4 mode, or using a skip mode. Here, the skip mode is a mode in which only prediction mode information of the current block is encoded. In the skip mode, separate data, such as a residual signal or motion vector information, is not encoded, and only the prediction mode information indicating the skip mode is transmitted through a 1-bit flag. In the video decoding apparatus 150 illustrated in FIG. 5, when the current block is decoded in the skip mode, a predictive motion vector of the current block is decided using a motion vector of an adjacent block, and a motion compensated value obtained based on the predictive motion vector is used as a decoded value of the current block.

Table 1 shows various examples of prediction modes usable for compressing and encoding a video. In Table 1, exemplary prediction modes are listed, and n prediction modes (Here, n is a positive integer.) provided in the present inventive concept may be smaller or larger than the number of the listed exemplary prediction modes.

TABLE 1

| | | Index |
|---|---|---|
| | Intra-Block mode | |
| 1 | Intra 16 × 16_Vertical | 00000 |
| 2 | Intra 16 × 16_Horizontal | 00001 |
| 3 | Intra 16 × 16_DC | 00010 |
| 4 | Intra 16 × 16_Plane | 00011 |
| 5 | Intra 4 × 4_Vertical | 00100 |
| 6 | Intra 4 × 4_Horizontal | 00101 |
| 7 | Intra 4 × 4_DC | 00110 |
| 8 | Intra 4 × 4_Diagonal Down Left | 01000 |
| 9 | Intra 4 × 4_Diagonal Down Right | 01001 |
| 10 | Intra 4 × 4_Vertical Right | 01010 |
| 11 | Intra 4 × 4_Horizontal Down | 01011 |
| 12 | Intra 4 × 4_Vertical Left | 01100 |
| 13 | Intra 4 × 4_Horizontal Up | 01101 |
| | Inter-Block mode | |
| 14 | Inter SKIP | 01110 |
| 15 | Inter 16 × 16 | 01111 |
| 16 | Inter 16 × 8 | 10000 |
| 17 | Inter 8 × 16 | 10001 |
| 18 | Inter 8 × 8 | 10010 |
| 19 | Inter 8 × 4 | 10011 |
| 20 | Inter 4 × 8 | 10100 |
| 21 | Inter 4 × 4 | 10101 |

FIG. 3 shows how blocks are encoded in the respective intra prediction modes listed in Table 1.

In detail, referring again to FIG. 1, the prediction mode deciding unit 120 decides a final prediction mode to be applied to encode blocks included in the current picture using prediction mode information of previously encoded reference picture. For example, the prediction mode deciding unit 120 decides the final prediction mode to be used by the encoding unit 110 in compressing and encoding the blocks included in the current picture. As described above, the prediction unit 119 may store n prediction modes used in compressing and encoding the input video and may perform the predictive encoding on the current block by adopting the n prediction modes. The prediction mode deciding unit 120 determines a prediction mode having a minimum cost by calculating costs depending on the n prediction modes and thus, decides the determined prediction mode as the final prediction mode of the current block. In addition, the prediction mode deciding unit 120 outputs a predicted block generated using the final prediction mode to the subtractor 111 and the adder 117.

In detail, the prediction unit 119 may divide the input video into blocks having a predetermined size and may generate predicted blocks of the divided blocks for the n prediction modes by referring to predicted pictures stored in the storage unit 118. The prediction mode deciding unit 120 selects a predicted block generated by the final prediction mode among the predicted blocks generated by the prediction unit 119 and outputs the predicted block generated by the final prediction mode to the subtractor 111 and the adder 117. A method of deciding the final prediction mode by a prediction mode deciding unit 120 will later be described.

The subtractor 111 generates a residual that corresponds to a difference value between the predicted block of the current block provided from the prediction mode deciding unit 120 and an original video block. That is to say, redundancy in a picture frame is removed from a pixel region of the video.

The transformation unit 112 transforms the residual into a frequency domain, and the quantization unit 113 quantizes the transformed residual. The entropy coding unit 114 performs variable length coding (VLC) on quantized video data and generates bit streams. For example, the transformation unit 112 may perform a discrete cosine transform (DCT), but aspects of the present inventive concept are not limited thereto.

The inverse quantization unit 115 performs inverse quantization on the transformed residual data and the inverse transformation unit 116 performs inverse transformation on the quantized residual data to reconstruct the residual data. The adder 117 adds the reconstructed residual data with predicted data (e.g., a predicted block output from the prediction unit 119).

A filter unit 121 filters the block output from the adder 117 and reconstructs the current block. The current block reconstructed by the filter unit 121 is stored in the storage unit 118 to be used as reference data of the next block.

Referring to FIG. 4, the prediction mode deciding unit 120 includes a first prediction mode deciding unit 130 and a final prediction mode deciding unit 140. The first prediction mode deciding unit 130 selects first prediction modes among n prediction modes using a first cost function. The final prediction mode deciding unit 140 selects a final prediction mode among the first prediction modes using a second cost function.

The first prediction mode deciding unit 130 may include a sum of absolute transformed difference (SATD) operation unit 133 and a first prediction mode storage unit 135.

The SATD operation unit 133 obtains first cost function values of the n prediction modes using the first cost function. Here, the first cost function may include a sum of absolute transformed difference (SATD) operation, and the SATD operation unit 133 may perform the SATD operation for the n prediction modes. The first cost function can be expressed by Equation (1):

$$Jfirst(mode)=SATD(mode)+Header\_cost(mode) \quad (1)$$

where 'mode' is a prediction mode to be calculated among the n prediction modes, 'Jfirst' is the first cost function, and 'Header_cost' is an index value of the prediction mode. For example, the first cost function may be a sum of the SATD operation and Header_cost.

The SATD operation unit 133 may obtain the first prediction modes using the first cost function values. For example, the first cost function values of the n prediction modes are obtained and k prediction modes having small first cost function values are selected as the first prediction modes among the n prediction modes, where k is a positive integer smaller than or equal to n (k≤n).

The SATD operation unit 133 may select the first prediction modes using a critical range. For example, the SATD operation unit 133 may obtain the first cost function values of the respective n prediction modes and may obtain a minimum prediction mode having the smallest first cost function value. In addition, the k prediction modes having first cost function values within a critical range from a first cost function value (e.g., the smallest first cost function value) of the minimum prediction mode may be selected as the first prediction modes.

For example, prediction modes having desired first cost values may be selected as the first prediction modes. Here, the critical range may be arbitrarily determined.

The first prediction mode storage unit 135 receives the first prediction modes, the first cost function values of the first prediction modes and Header_cost from the SATD operation unit 133 and stores the same.

The final prediction mode deciding unit 140 may include a sum of squared difference (SSD) operation unit 141, a first multiplier 143, a second multiplier 145, and a final prediction mode selection unit 147.

The final prediction mode deciding unit 140 decides the final prediction mode among the first prediction modes using a second cost function. The final prediction mode deciding unit 140 selects a first prediction mode having the smallest second cost function value as the final prediction mode to decode a block of the input video. The second cost function can be expressed by Equation (2):

$$J\text{second}(\text{mode1}) = a*\text{SSD}(\text{mode1}) + b*\text{SATD}(\text{mode1}) + \text{Header\_cost}(\text{mode1}) \quad (2)$$

where 'mode1' is a first prediction mode to be calculated among the first prediction modes, 'Jsecond' is the second cost function, 'Header_cost' is an index value of the prediction mode, '*' denotes multiplication, and 'a' and 'b' are transformation coefficients.

The second cost function may include an SSD operation and an SATD operation. Therefore, the second cost function may be different from the first cost function.

The transformation coefficients a and b may be determined as values to satisfy the following Equation (3):

$$J\text{second}(\text{mode}) \approx J(\text{mode}) = \text{SSD}(\text{mode}) + \lambda(\text{mode})*R \quad (3),$$

where J is a rate-distortion cost function, λ is a Lagrangian coefficient, and R is a bit rate.

If the transformation coefficients a and b values are determined such that the resulting value from the second cost function is approximately equal to a resulting value from a rate-distortion cost function, the final prediction mode obtained by the second cost function and the final prediction mode obtained by the rate-distortion cost function may be equal to each other.

The transformation coefficients a and b may also be arbitrarily determined according to significance assessed by a user. In this case, the final prediction mode obtained in the video prediction mode deciding apparatus 100 according to an embodiment of the present inventive concept may be different from the final prediction mode obtained using the rate-distortion cost function.

In a general encoding apparatus, a prediction mode is selected using the rate-distortion cost function and a block of the input video is encoded using the selected prediction mode (e.g., the final prediction mode).

In this case, however, since final prediction modes for various blocks are selected by substituting all available prediction modes to the rate-distortion cost function, computation time and complexity are increased. By contrast, according to an embodiment of the present inventive concept, some first prediction modes among n prediction modes are selected and then, a final prediction mode is selected among the first prediction modes. Thus, the computation time and complexity required to select the final prediction mode are reduced. In addition, if the transformation coefficients a and b are appropriately determined, the final prediction mode obtained according to an embodiment of the present inventive concept may be equal to the final prediction mode obtained using the rate-distortion cost function. Therefore, computation time and complexity required to obtain the same result are reduced.

The first multiplier 143 receives SATD values of k first prediction modes from the first prediction mode storage unit 135 and multiplies the received SATD values with the transformation coefficient b. The SATD values are multiplied with the transformation coefficient b and the multiplied result are supplied to the final prediction mode selector 147.

The SSD operation unit 141 performs the SSD operation on each of the k first prediction modes received from the first prediction mode storage unit 135. After performing the SSD operation, result values are multiplied with the transformation coefficient a through the second multiplier 145 and is then supplied to the final prediction mode selector 147. The final prediction mode selector 147 decides second cost function values based on the supplied data from the first and second multiplier 143, 145, selects a first prediction mode having the smallest second cost function value among the first prediction modes, and decides the selected first prediction mode as the final prediction mode. A predicted block generated by the selected final prediction mode is output to the subtractor 111 and the adder 117.

In an embodiment of the present inventive concept, the prediction mode deciding unit 120 and the prediction unit 119 have been separately described, but aspects of the present inventive concept are not limited thereto. For example, the prediction mode deciding unit 120 may be incorporated into the prediction unit 119.

Figure 5:
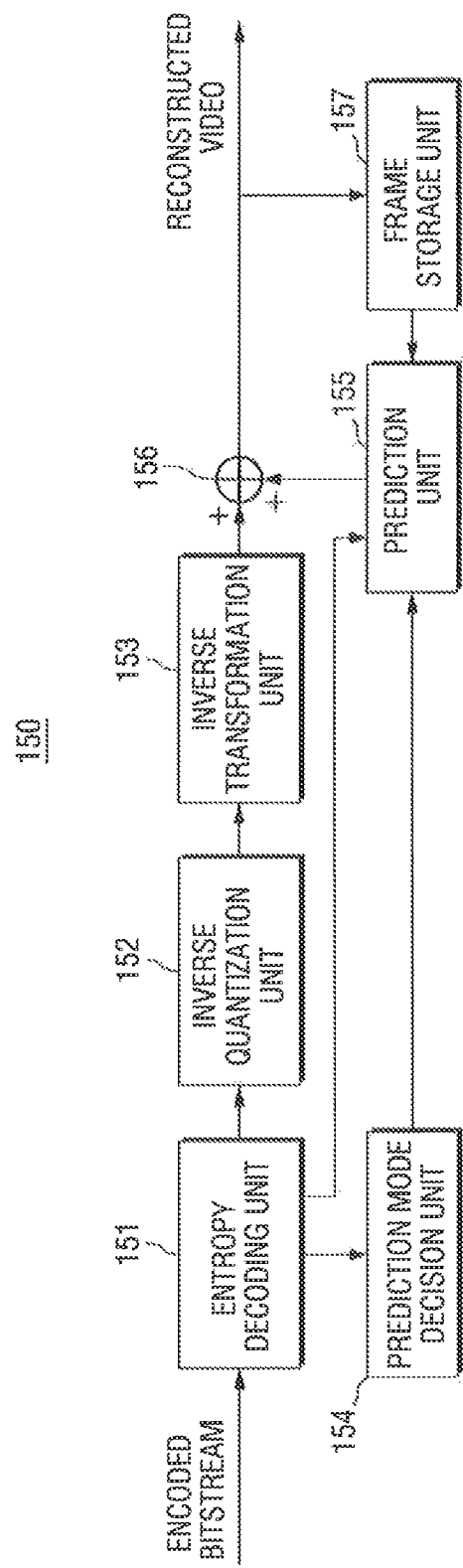
FIG. 5 is a block diagram of a video decoding apparatus according to an embodiment of the present inventive concept.

A video decoding apparatus according to an embodiment of the present inventive concept will be described with reference to FIG. 5. FIG. 5 is a block diagram of a video decoding apparatus according to an embodiment of the present inventive concept.

Referring to FIG. 5, the video decoding apparatus 150 according to an embodiment of the present inventive concept includes an entropy decoding unit 151, an inverse quantization unit 152, an inverse transformation unit 153, a prediction mode decision unit 154, a prediction unit 155, an adder 156, and a frame storage unit 157.

The entropy decoding unit 151 performs entropy-decoding on an encoded bit stream, and extracts final prediction mode information and video data of the decoded current block from the bit stream. The inverse quantization unit 152 performs inverse quantization on the entropy-decoded video data and outputs the inversely quantized video data to the inverse transformation unit 153. The inverse transformation unit 153 performs inverse transformation on the inversely quantized video data to reconstruct a residual value and outputs the same.

The prediction mode decision unit 154 decides the final prediction mode of the current block decoded from the extracted final prediction mode information and transfers the final prediction mode information to the prediction unit 155. The prediction unit 155 performs inter prediction and/or intra prediction according to the final prediction mode of the decoded current block and generates a predicted block of the current block.

The adder 156 adds the residual with the predicted block and generates reconstructed video data. However, the process of adding the residual with the predicted block is performed on the remaining prediction modes, except for the skip mode. In the skip mode, motion-compensated data itself, without separate residual data, corresponds to the reconstructed video data. The frame storage unit 157 stores information of previously decoded pictures to decode the next block.

Figure 6:
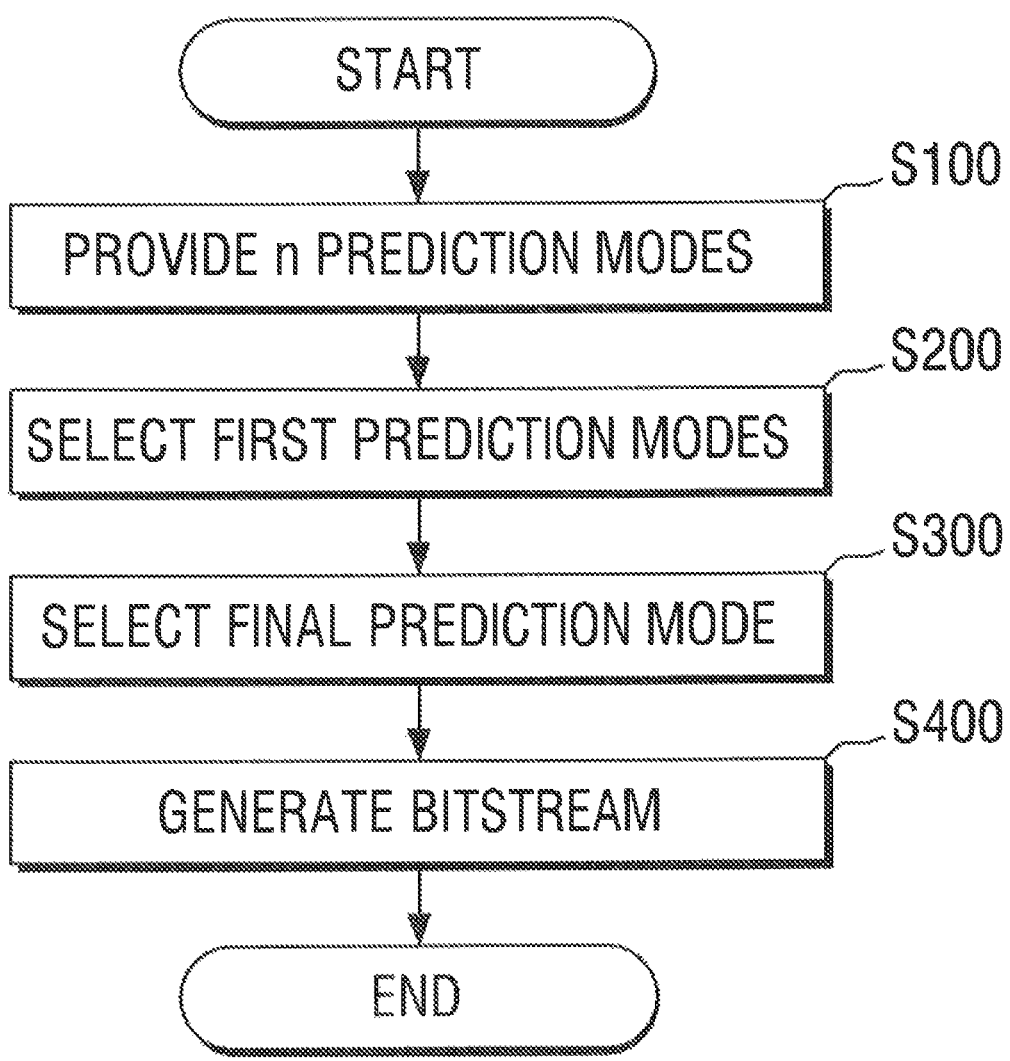
FIG. 6 is a flowchart of a method for deciding a video prediction mode according to an embodiment of the present inventive concept.
Figure 7:
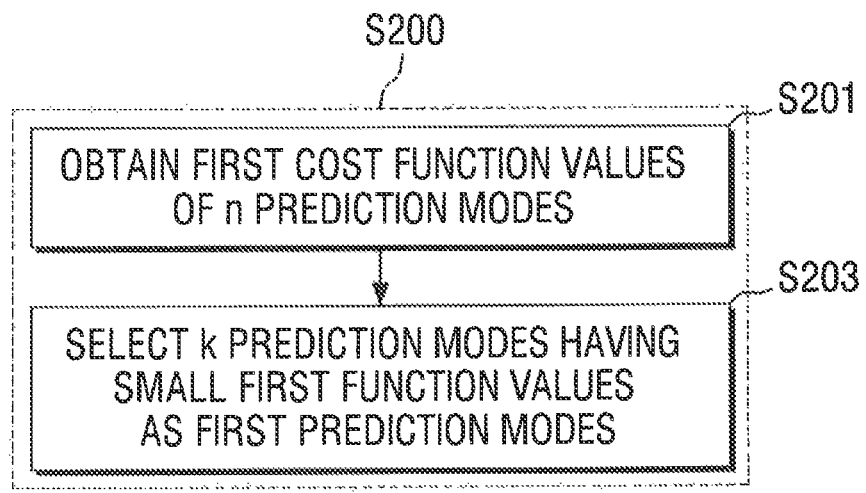
FIGS. 7 and 8 are detailed flowcharts of step S200 of FIG. 6.
Figure 8:
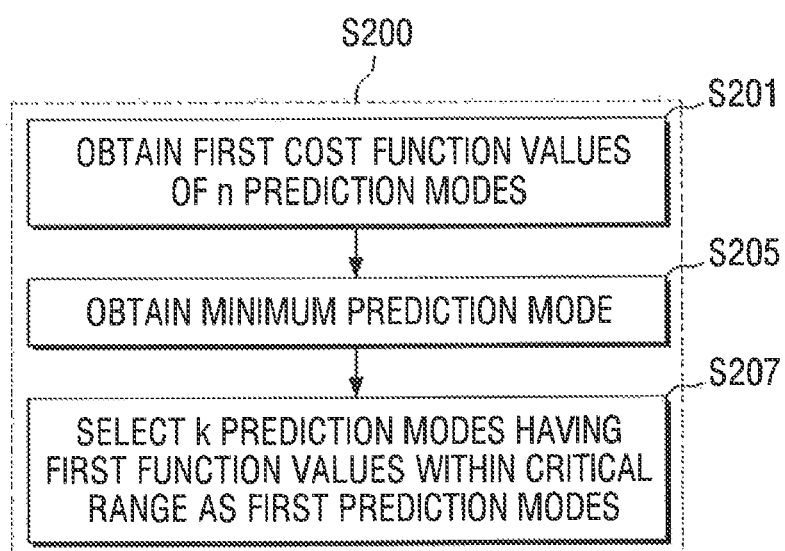

A method of deciding a video prediction mode according to an embodiment of the present inventive concept will be described with reference to FIGS. 6 to 8. FIG. 6 is a flowchart of a method for deciding a video prediction mode according to an embodiment of the present inventive concept, and FIGS. 7 and 8 are detailed flowcharts of step S200 of FIG. 6.

Referring to FIG. 6, at first, n prediction modes are provided (S100). The n prediction modes may include an intra prediction mode and/or an inter prediction mode.

Next, first prediction modes are selected among the n prediction modes using a first cost function (S200).

The first cost function may be represented by Equation (1). Therefore, the first cost function may include an SATD operation. In addition, the first prediction mode may include a plurality of first prediction modes.

An exemplary embodiment for obtaining the first prediction mode will now be described.

Referring to FIG. 7, first cost function values of the n prediction modes are obtained (S201). The respective n prediction modes are applied to Equation (1) to obtain the first cost function values.

Next, among the n prediction modes, k prediction modes having small first cost function values are selected (S203). The k prediction modes become the first prediction modes and a final prediction mode is selected from the k prediction modes. Here, k is a positive integer less than n or equal to, and may be arbitrarily determined.

An exemplary embodiment for obtaining the first prediction modes will now be described.

Referring to FIG. 8, first cost function values of the n prediction modes are obtained (S201).

Next, the first cost function values are compared to each other to obtain a minimum prediction mode having the smallest first cost function value (S205).

Next, k prediction modes having the first cost function values within a critical range from the first cost function value of the minimum prediction mode are selected as first prediction modes (S207). Here, the critical range may be arbitrarily determined.

In the process of obtaining the first prediction modes shown in FIG. 8, since the prediction modes corresponding to the first cost function values within the critical range are selected as the first prediction modes, the number of prediction modes selected as the first prediction modes may vary. However, in the process of obtaining the first prediction modes shown in FIG. 8, a fixed number (i.e., k) of prediction modes are selected as the first prediction modes.

Referring again to FIG. 6, a final prediction mode is selected among the first prediction modes using the second cost function different from the first cost function (S300). The second cost function may include an SSD operation and an SATD operation, and the second cost function may be represented by Equation (2). The first prediction modes are applied to the second cost function to obtain second cost function values of the respective first prediction modes. Thus, the a first prediction mode having the smallest second cost function value may be selected as the final prediction mode.

Next, a block of the input video is encoded using the selected final prediction mode to generate a bit stream (S400). The generated bit stream may be decoded through a subsequent decoding process. The method for deciding a video prediction mode according to an embodiment of the present inventive concept may be executed by hardware or software. In a case where the method for deciding a video prediction mode according to an embodiment of the present inventive concept is executed by software, a program configuring the software may be installed in a computer. Here, the computer may be a computer having a built-in dedicated hardware. Alternatively, the computer may be a cloud-based computer that is synchronized with a program stored in the server or downloads the program from the server to be used by a user.

A computer hardware structure of executing a method for deciding a video prediction mode according to an embodiment of the present inventive concept using a program will be described with reference to FIG. 9.

Figure 9:
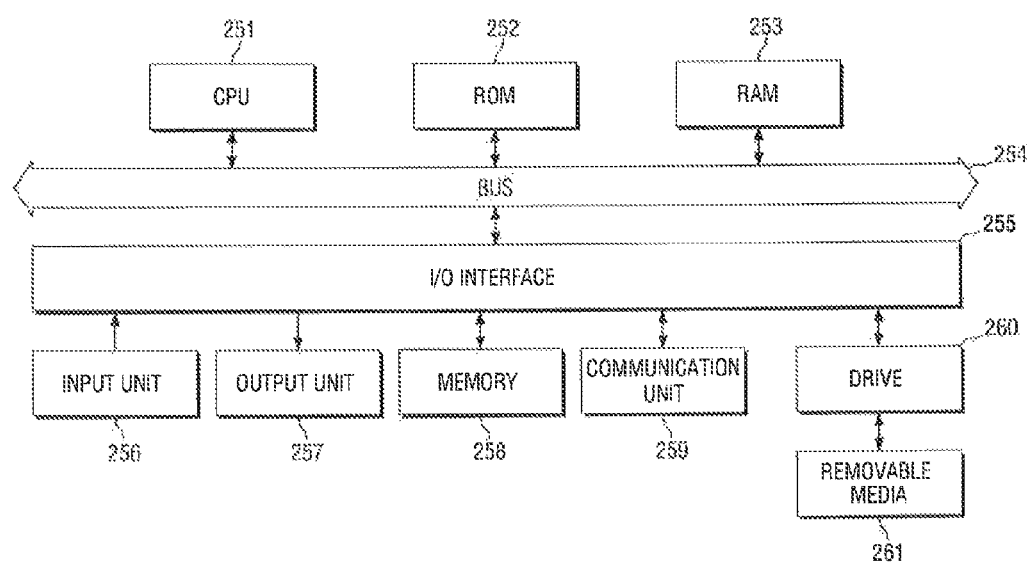
FIG. 9 is a block diagram illustrating an example of hardware structure of a computer, according to an embodiment of the present inventive concept.

FIG. 9 is a block diagram illustrating a hardware structure example of a computer to which the present inventive concept is applied.

In the computer, a central processing unit (CPU) 251, a read only memory (ROM) 252, and a random access memory (RAM) 253 are connected to each other through a bus 254.

In addition, an input/output (I/O) interface 255 is connected to the bus 254. An input unit 256, an output unit 257, a memory 258, a communication unit 259, and a drive 260 are connected to the I/O interface 255.

The input unit 256 may include, for example, a keyboard, a mouse, a microphone, and so on. The output unit 257 may include, for example, a display, a speaker, and so on. The memory 258 may include, for example, a hard disk or a nonvolatile memory. The communication unit 259 may include, for example, a network interface. The drive 260 may drive a removable media 261, such as a magnetic disk, an optical disk, an optomagnetic disk, a semiconductor memory, or the like.

In the computer configured as described above, the CPU 251 loads the program stored in the memory 258 to the RAM 253 through the I/O interface 255 and the bus 254, executes the program, and thus performs the series of processes described above.

The program executed by the CPU 251 may be recorded in the removable media 261 (e.g., package media) and may be provided. In addition, the program may be provided through wired or wireless transmission media, such as a local area network, internet, a digital broadcasting, or the like.

The removable media 261 may be installed in the drive 260 and thus the program may be installed in the memory 258 through the I/O interface 255. In addition, the program may be received in the communication unit 259 through wired/wireless transmission media and then may be installed in the memory 258. Additionally, the program may be previously installed in the ROM 252 or the memory 258.

In addition, the program executed by the computer may be a program processed in time series according to the sequence of the method for deciding the video prediction mode according to an embodiment of the present inventive concept or may be a program processed in parallel or at a necessary timing, for example, when a calling is performed.

Embodiments of the present inventive concept are not limited to the aforedescribed features and may be modified in various manners within the scope of the present inventive concept.

The video prediction mode deciding apparatus 100 illustrated in FIG. 1 or the video decoding apparatus 150 illustrated in FIG. 5 according to an embodiment of the present inventive concept may be applied to an arbitrary electronic device, which will now be described.

Figure 10:
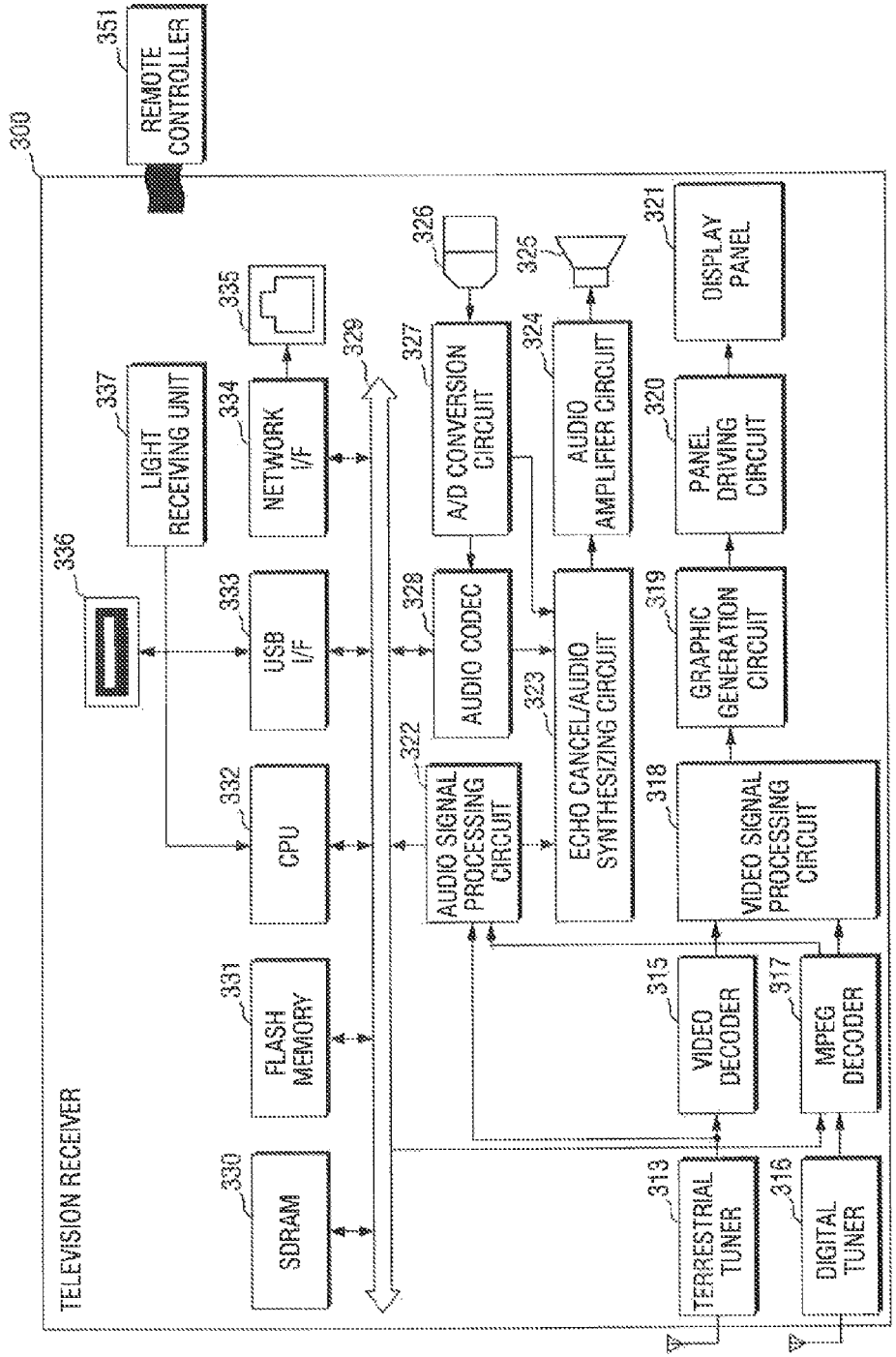
FIG. 10 is a block diagram illustrating an example of main structures of a television receiver using a video decoding apparatus according to an embodiment of the present inventive concept.

FIG. 10 is a block diagram illustrating examples of main structures of a television receiver using a video decoding apparatus according to an embodiment of the present inventive concept.

The television receiver 300 shown in FIG. 10 includes a terrestrial tuner 313, a video decoder 315, a video signal processing circuit 318, a graphic generation circuit 319, a panel driving circuit 320, and a display panel 321.

The television receiver 300 may include an audio analog/digital (A/D) conversion circuit 327, an audio signal processing circuit 322, an echo cancel/audio synthesizing circuit 323, an audio amplifier circuit 324, and a speaker 325.

The terrestrial tuner 313 receives a terrestrial analog broadcasting signal through an antenna, demodulates the same, acquires a video signal, and supplies the acquired video signal to the video decoder 315. The video decoder 315 decodes the video signal supplied from the terrestrial tuner 313 and supplies the decoded digital signal to the video signal processing circuit 318.

The video signal processing circuit 318 performs a predetermined process (e.g., noise removal) on the decoded video signal supplied from the video decoder 315 and supplies an output of the video signal processing unit 318 to the graphic generation circuit 319.

The graphic generation circuit 319 generates video data of the program displayed on the display panel 321 or picture data that is processed based on an application supplied through a network, and supplies the generated video data or picture data to the panel driving circuit 320. In addition, the graphic generation circuit 319 generates video data (e.g., graphic data) for displaying a variety of screens used by the user through item selection and supplies the video data obtained by overlapping the generated video data with the video data of the program to the panel driving circuit 320.

The panel driving circuit 320 drives the display panel 321 based on data supplied from the graphic generation circuit 319 and displays the video data of the program or the screens on the display panel 321.

The display panel 321 includes a liquid crystal display (LCD) and displays the video data of the program under the control of the panel driving circuit 320.

The terrestrial tuner 313 demodulates the received broadcasting wave signal and acquires not only a video signal but an audio signal. The terrestrial tuner 313 supplies the acquired audio signal to the audio A/D conversion circuit 314.

The audio A/D conversion circuit 327 performs A/D conversion on the audio signal supplied from the terrestrial tuner 313 and supplies a converted digital audio signal to the audio signal processing circuit 322.

The audio signal processing circuit 322 performs a predetermined process (e.g., noise removal) on the audio data supplied from the audio A/D conversion circuit 314 and supplies an output of the audio signal processing circuit 322 to the echo cancel/audio synthesizing circuit 323.

The echo cancel/audio synthesizing circuit 323 supplies the audio data supplied from the audio signal processing circuit 322 to the audio amplifier circuit 324.

The audio amplifier circuit 324 performs digital/audio (D/A) conversion on the audio data supplied from the echo cancel/audio synthesizing circuit 323, amplifies the same, tunes the amplified audio data to a predetermined sound volume, and outputs the tuned audio data through the speaker 325.

In addition, the television receiver 300 includes a digital tuner 316 and an MPEG decoder 317.

The digital tuner 316 receives a terrestrial digital broadcasting signal, a broadcasting satellite (BS) broadcasting signal, or a communications satellite (CS) broadcasting signal through the antenna, demodulates the same, and supplies the demodulated signal to the decoder 317.

The MPEG decoder 317 cancels scrambling embodied on the signal stream supplied from the digital tuner 316 and extracts the signal stream including the data of the program to be reproduced or to be viewed by a viewer. The MPEG decoder 317 decodes audio data constituting the extracted stream, and supplies the decoded audio data to the audio signal processing circuit 322 and the video signal processing circuit 318. In addition, the MPEG decoder 317 supplies electronic program guide (EPG) data extracted from the digital tuner 316 to the CPU 332 through a path (not shown).

In the television receiver 300, the above-described video decoding apparatus 150 illustrated in FIG. 5 may be used as the MPEG decoder 317 that decodes the video data.

Like the video data supplied from the video decoder 315, the video data supplied from the MPEG decoder 317 is subjected to a predetermined process in the video signal processing circuit 318. In addition, the video data subjected to the predetermined process is appropriately overlapped with the generated video data in the graphic generation circuit 319, is supplied to the display panel 321 through the panel driving circuit 320, and thus, the supplied vide data is displayed as a picture.

Like the audio data supplied from the audio A/D conversion circuit 327, a predetermined process is performed on the audio data supplied from the MPEG decoder 317 in the audio signal processing circuit 322. In addition, the audio data on which the predetermined process is performed is supplied to the audio amplifier circuit 324 through the echo cancel/audio synthesizing circuit 323 and D/A conversion or amplification is performed on the supplied audio data. Thus, the audio data tuned to a predetermined sound volume is output from the speaker 325.

In addition, the television receiver 300 includes a microphone 326 and an A/D conversion circuit 327.

The A/D conversion circuit 327 receives user's audio signal introduced by the microphone 326 installed in the television receiver 300 for audio conversation. The A/D conversion circuit 327 performs A/D conversion on the received audio signal and supplies the converted digital audio data to the echo cancel/audio synthesizing circuit 323.

The echo cancel/audio synthesizing circuit 323 performs echo cancellation on the user's audio data when the user's audio data of the television receiver 300 is supplied to the A/D conversion circuit 327. The echo cancel/audio synthesizing circuit 323 synthesizes the echo-cancelled audio data with another audio data and then, outputs the synthesized audio data through the audio amplifier circuit 324 and the speaker 325.

In addition, the television receiver 300 includes an audio codec 328, an internal bus 329, a synchronous dynamic random access memory (SDRAM) 330, a flash memory 331, a CPU 332, a universal serial bus (USB) I/F 333, and a network I/F 334.

The A/D conversion circuit 327 receives user's audio signal introduced by the microphone 326 installed in the television receiver 300 for audio conversation. The A/D conversion circuit 327 performs A/D conversion on the received audio signal and supplies the A/D converted digital audio data to the audio codec 328.

The audio codec 328 converts the audio data supplied from the A/D conversion circuit 327 into data having a predetermined format for transmission via a network and supplies the converted data to the network I/F 334 through the internal bus 329.

The network I/F 334 is connected to the network through a cable installed in the network terminal 335. For example, the network I/F 334 transmits the audio data supplied from the audio codec 328 to another device connected to the network. In addition, the network I/F 334 receives the audio data transmitted from another device through the network terminal 335 and supplies the received audio data to the audio codec 328 through the internal bus 329.

The audio codec 328 converts the audio data supplied from the network I/F 334 into data having a predetermined format and supplies the converted audio data to the echo cancel/audio synthesizing circuit 323.

The SDRAM 330 stores various kinds of data that is necessary for the CPU 332 to perform various processes.

The flash memory 331 stores a program executed by the CPU 332. The program stored in the flash memory 331 is read by the CPU 332 at a predetermined timing, for example, when the television receiver 300 is driven. The flash memory 331 also stores EPG data acquired through a digital broadcasting signal and data acquired from a predetermined server through the network.

For example, a data stream including content data acquired from a predetermined server through the network under the control of the CPU 332 is stored in the flash memory 331. The flash memory 331 supplies the data stream to the MPEG decoder 317 through the internal bus 329 under the control of the CPU 332.

Like the data stream supplied from the digital tuner 316, the data stream supplied from the flash memory 331 is processed by the MPEG decoder 317. In such a manner, the television receiver 300 receives content data, such as video data, audio data, or the like through the network, decodes the received content data using the MPEG decoder 317, and thus, displays the video data or outputs the audio data.

In addition, the television receiver 300 further includes a light receiving unit 337 that receives an infrared light signal transmitted from a remote controller 351.

The light receiving unit 337 receives the infrared rays from the remote controller 351 and outputs a control code indicating user's manipulated data obtained by demodulation to the CPU 332.

The CPU 332 executes the program stored in the flash memory 331 and controls the overall operation of the television receiver 300 according to the control code supplied from the light receiving unit 337. The CPU 332 and various parts of the television receiver 300 may be connected to each other through a plurality of paths (not shown).

The USB I/F 333 performs data transmission and reception between the television receiver 300 and an external device connected to the television receiver 300 through a USB cable mounted in the USB terminal 336. The network I/F 334 is connected to the network through a cable mounted in the network terminal 335 and transmits/receives data other than audio data to/from various devices connected to the network.

In the television receiver 300, the decoding apparatus 150 illustrated in FIG. 5 according to an embodiment of the present inventive concept may be used as the MPEG decoder 317.

Figure 11:
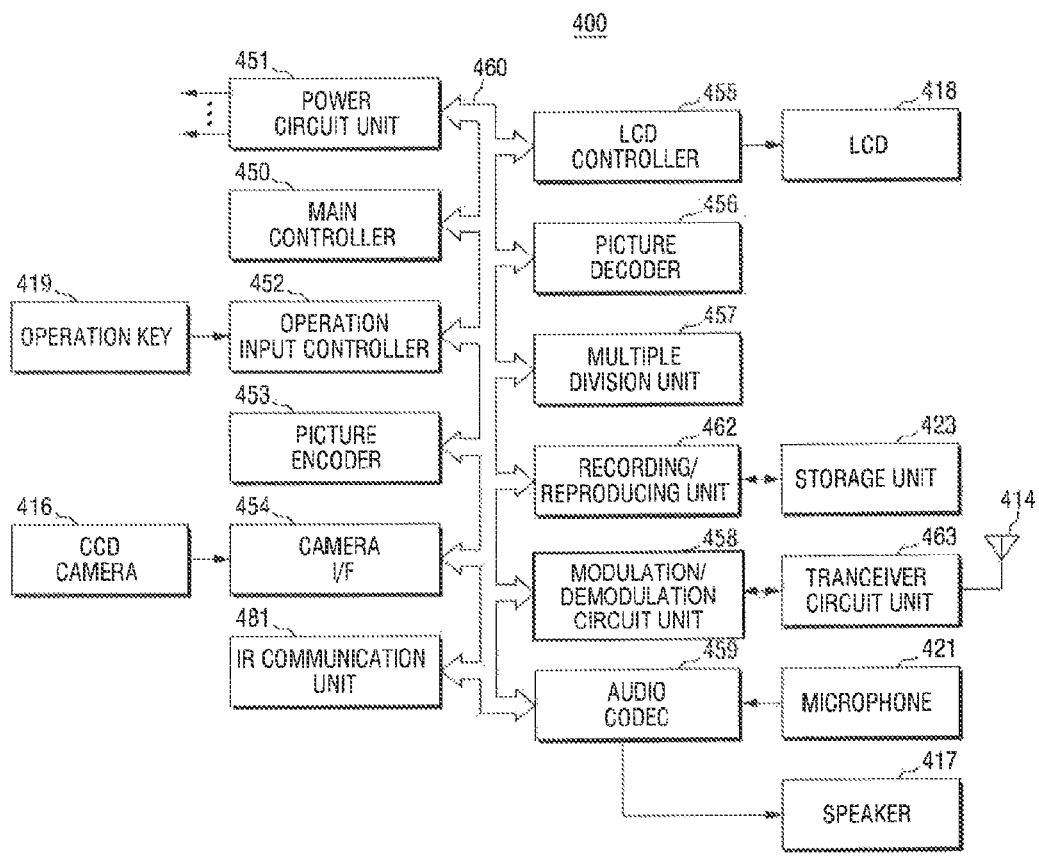
FIG. 11 is a block diagram illustrating an example of main structures of a mobile phone, according to an embodiment of the present inventive concept.

FIG. 11 is a block diagram illustrating an example of main structures of a mobile phone to which the present inventive concept is applied.

The cellular phone 400 shown in FIG. 11 includes a main controller 450 configured to generally control various units, a power circuit unit 451, an operation input controller 452, a picture encoder 453, a camera I/F 454, an LCD controller 455, a picture decoder 456, a multiple division unit 457, a recording/reproducing unit 462, a modulation/demodulation circuit unit 458, and an audio codec 459, which are connected to each other through a bus 460.

In addition, the cellular phone 400 includes an operation key 419, a charge coupled device (CCD) camera 416, an LCD 418, a storage unit 423, a transceiver circuit unit 463, an antenna 414, a microphone 421, and a speaker 417.

When an on-hook key and a power key are turned on by a user's manipulation, the power circuit unit 451 supplies power from a battery pack to various units and thus, drives the cellular phone 400 to be operable.

The cellular phone 400 performs various operations including transmission and reception of audio signals, e-mail or picture data, photographing of pictures, or recording of data in various modes, such as an audio communication mode, a data communication mode or the like, based on the control of the main controller 450 including a CPU, an ROM, and an RAM.

In the audio communication mode, for example, the cellular phone 400 converts an audio signal focused on the microphone 421 into digital audio data through the audio codec 459, spectrally spreads the converted digital audio data in the modulation/demodulation circuit unit 458, and performs D/A conversion and frequency conversion through the transceiver circuit unit 463. The cellular phone 400 transmits a transmission signal that is obtained by the conversion processes to a base station (not shown) through the antenna 414. The transmission signal (e.g., audio signal) transmitted to the base station is supplied to a cellular phone of an opposing communication party through a public switched telephone network.

In addition, in the audio communication mode, for example, the cellular phone 400 amplifies the signal received from the antenna 414, or performs frequency conversion or A/D conversion on the same in the transceiver circuit unit 463, spectrally inversely spreads the received signal in the modulation/demodulation circuit unit 458, and converts the resulting signal into an analog audio signal by the audio codec 459. The cellular phone 400 outputs the analog audio signal obtained by the conversion processes through the speaker 417.

In addition, when an e-mail is transmitted in the data communication mode, for example, the cellular phone 400 receives text data of the e-mail input by manipulation of the operation key 419 in the operation input controller 452. The cellular phone 400 processes the text data in the main controller 450 and displays the same on the LCD 418 as a picture through the LCD controller 455.

In addition, the cellular phone 400 generates e-mail data in the main controller 450 based on the text data received in the operation input controller 452. The cellular phone 400 spectrally spreads the e-mail data in the modulation/demodulation circuit unit 458 and performs D/A conversion and frequency conversion on the same in the transceiver circuit unit 463. The cellular phone 400 transmits a transmission signal obtained by the conversion processes to a base station (not shown) through the antenna 414. The transmission signal (e.g., e-mail) transmitted to the base station is supplied to a predetermined recipient party through a network or a mail server.

In addition, when an e-mail is received in the data communication mode, for example, the cellular phone 400 receives and amplifies the signal transmitted from the base station through the antenna 414 and performs frequency conversion or A/D conversion on the same in the transceiver circuit unit 463. The cellular phone 400 spectrally inversely spreads the received signal in the modulation/demodulation circuit unit 458 to reconstruct the original e-mail data. The cellular phone 400 displays the reconstructed e-mail data on the LCD 418 through the LCD controller 455.

The cellular phone 400 may also record (or store) the e-mail data in the storage unit 423 through the recording/reproducing unit 462.

The storage unit 423 is an arbitrary rewritable memory medium. The storage unit 423 may include a semiconductor memory such as an RAM, a built-in flash memory, or the like, or a hard disk. Alternatively, the storage unit 423 may include a removable media such as a magnetic disk, an optical disk, a USB memory or a memory card (e.g., an SD card or a micro SD card), an optomagnetic disk, or the like.

In addition, when picture data is transmitted in the data communication mode, for example, the cellular phone 400 generates picture data in the CCD camera 416 by photographing. The CCD camera 416 includes an optical device such as a lens or iris (e.g., throttle valve) and a CCD as a photoelectric conversion device, photographs a subject, converts intensity of received light into an electric signal, and generates picture data of a subject picture. The picture data is compressively encoded in the picture encoder 453 through the camera I/F 454 using a predetermined encoding method, such as an MPEG4 and/or a HEVC, and is converted into encoded picture data.

The cellular phone 400 may use the video prediction mode deciding apparatus 100 illustrated in FIG. 1 as the picture encoder 453 that performs the aforementioned processes. Therefore, the picture encoder 453 may obtain an optical prediction mode with a small quantity of computations within a short time, like the video prediction mode deciding apparatus 100 illustrated in FIG. 1.

At the same time, the cellular phone 400 performs A/D conversion on the audio signal focused on the microphone 421 and encodes the A/D converted audio signal in the audio codec 459 during photographing using the CCD camera 416.

The cellular phone 400 multiplexes the encoded picture data supplied from the picture encoder 453 and the digital audio data supplied from the audio codec 459 in the multiple division unit 457. The cellular phone 400 spectrally spreads the obtained multiplexed data in the modulation/demodulation circuit unit 458 and performs D/A conversion and frequency conversion on the spectrally spread data in the transceiver circuit unit 463. The cellular phone 400 transmits a transmission signal obtained by the conversion processes to a base station (not shown) through the antenna 414. The transmission signal (e.g., picture data) transmitted to the base station is supplied to an opposing communication party through a network.

In addition, when the picture data is not transmitted, the cellular phone 400 may display the picture data generated in the CCD camera 416 on the LCD 418 through the LCD controller 455 without going through the picture encoder 453.

In addition, when data of a motion picture file linked to a simplified home page is received in the data communication mode, for example, the cellular phone 400 receives and amplifies a signal transmitted from the base station through the antenna 414 and performs frequency conversion and A/D conversion on the same. The cellular phone 400 spectrally inversely spreads the received signal in the modulation/demodulation circuit unit 458 to reconstruct the original multiplexed data. The cellular phone 400 divides the multiplexed data in the multiple division unit 457 and separates the same into encoded picture data and encoded audio data.

The cellular phone 400 decodes the encoded picture data in the picture decoder 456 using a decoding method corresponding to the predetermined encoding method such as MPEG4 and/or HEVC, generates motion picture data to be reproduced, and displays the generated motion picture data on the LCD 418 through the LCD controller 455. Accordingly, the motion picture data included in the motion picture file linked to the home page is displayed on the LCD 418.

The cellular phone 400 may use the video decoding apparatus 150 illustrated in FIG. 5 as the picture decoder 456 performing the aforementioned processes.

At the same time, the cellular phone 400 converts digital audio data into an analog audio signal in the audio codec 459 and outputs the converted analog audio signal through the speaker 417. Accordingly, for example, the audio data included in the motion picture file linked to a simplified home page is reproduced.

In addition, like in the case of e-mail, the cellular phone 400 may also record (or store) the received data linked to the simplified home page in the storage unit 423 through the recording/reproducing unit 462.

In addition, the cellular phone 400 may analyze a 2D code which is photographed in the main controller 450 and obtained from the CCD camera 416, and may acquire information recorded in the 2D code.

In addition, the cellular phone 400 may communicate with an external device by infrared (IR) rays in an IR communication unit 481. The cellular phone 400 may use the video prediction mode deciding apparatus 100 illustrated in FIG. 1 as the picture encoder 453 and thus may obtain an optical prediction mode with a small quantity of computations within a short time. Consequently, the cellular phone 400 may provide encoded data (e.g., picture data) to another device within a short time.

In addition, the cellular phone 400 may use the video decoding apparatus 150 illustrated in FIG. 5 as the picture decoder 456.

Although the cellular phone 400 using the CCD camera 416 has been described in the illustrated embodiment, an image sensor using complementary metal oxide semiconductor (CMOS) (i.e., a CMOS image sensor) may be used instead of the CCD camera 416. Here, like in the case of using the CCD camera 416, the cellular phone 400 may photograph a subject and may generate picture data of a subject picture.

In addition, although the present inventive concept has been described with regard to the cellular phone 400, any type of device (e.g., a personal digital assistant (PDA), a smart phone, a tablet PC, an ultra mobile personal computer (UMPC), a net book, a notebook type computer, etc.) having the same photographing or communicating function as the cellular phone 400 may adopt the video prediction mode deciding apparatus 100 illustrated in FIG. 1 or the video decoding apparatus 150 illustrated in FIG. 5.

FIG. 12 is a block diagram illustrating an example of main structures of a camera to which the present inventive concept is applied.

The camera 600 shown in FIG. 12 may photograph a subject and may display a picture of the subject on an LCD 616 or may record the photographed subject on a recording media 633 as picture data.

A lens block 611 makes light (i.e., a video of the subject) incident into a CCD/CMOS 612. The CCD/CMOS 612, an image sensor using a CCD or a CMOS, converts intensity of the received light into an electrical signal and supplies the converted electrical signal to a camera signal processor 613.

The camera signal processor 613 converts the electrical signal supplied from the CCD/CMOS 612 into a Y, Cr, Cb chrominance signal to a picture signal processor 614. The picture signal processor 614 may perform a predetermined picture process on the picture signal supplied from the camera signal processor 613 under the control of a controller 621, or may encode the picture signal by an encoder 641 using, for example, MPEG and/or HEVC. The picture signal processor 614 supplies encoded data generated by encoding the picture signal to a decoder 615. In addition, the picture signal processor 614 acquires data for display generated in an on screen display OSD 620, and supplies the acquired data to the decoder 615.

Throughout the above-described processes, the camera signal processor 613 appropriately uses a dynamic random access memory (DRAM) 618 connected through a bus 617, and when necessary, retains the picture data or the encoded picture data in the DRAM 618.

The decoder 615 decodes the encoded data supplied from the picture signal processor 614 and supplies the decoded picture data to the LCD 616. In addition, the decoder 615 supplies data for display, which is supplied from the picture signal processor 614, to the LCD 616. The decoded picture data supplied from the LCD 616 and the data for display supplied from the decoder 615 are appropriately synthesized to display a synthesized picture.

The OSD 620 outputs the data for display, such as a menu screen or icons having symbols, letters or figures, to the picture signal processor 614 through the bus 617 under the control of the controller 621.

The controller 621 performs various processes based on signals indicating commands issued by a user using an operation unit 622 and controls the picture signal processor 614, the DRAM 618, an external interface 619, the OSD 620, and a media drive 623 through a bus 617. Programs or data which is necessary for the controller 621 to perform various processes are stored in a flash ROM 624.

For example, the controller 621 may encode the picture data stored in the DRAM 618 or may decode the encoded data stored in the DRAM 618, instead of the picture signal processor 614 or the decoder 615. Here, the controller 621 may perform an encoding or decoding process using the same method used by the picture signal processor 614 or the decoder 615, or using a different method from that used by the picture signal processor 614 or the decoder 615.

In addition, for example, when a picture printing initiating command is issued from the operation unit 622, the controller 621 reads picture data from the DRAM 618 and supplies the read picture data to a printer 634 that is connected to the external interface 619 through the bus 617 for printing.

In addition, for example, when a picture recording command is issued from the operation unit 622, the controller 621 reads the encoded data from the DRAM 618 and supplies the read encoded data to the recording media 633 that is mounted on the media drive 623 through the bus 617 for storage.

The recording media 633 may be an arbitrary readable, writable removable media 261 such as a magnetic disk, an optical disk, an optomagnetic disk, or a semiconductor memory, but the present inventive concept is not limited thereto. For example, the recording media 633 may also be a disk or a memory card. Alternatively, the recording media 633 may also be a non-contact IC card.

In addition, the media drive 623 and the recording media 633 may be incorporated to be configured by non-transferable storage media, such as a built-in hard disk drive or a solid state drive (SSD).

The external interface 619 may be configured by, for example, a USB I/O terminal, etc., and thus, may be connected to a printer 634 when a picture is printed. When necessary, a drive 631 is connected to the external interface 619, and a removable media 632 such as a magnetic disk, an optical disk or an optomagnetic disk is appropriated mounted and thereby installs a computer program read from the removable media 632 in the flash ROM 624.

In addition, the external interface 619 includes a network interface connected to a predetermined network such as a local area network (LAN) or internet. For example, the controller 621 may read encoded data from the DRAM 618 according to an instruction from the operation unit 622 and may supply the encoded data from the external interface 619 to another device connected through the network. In addition, the controller 621 acquires the encoded data supplied from another device through the network or the picture data through the external interface 619, retains the encoded data or picture data in the DRAM 618, and supplies the same to the picture signal processor 614.

The aforementioned camera 600 may use the video decoding apparatus 150 illustrated in FIG. 5 as the decoder 615.

In addition, the camera 600 uses the video prediction mode deciding apparatus 100 illustrated in FIG. 1 as the encoder 641. Therefore, the encoder 641 may obtain an optical prediction mode with a small quantity of computations within a short time, like the video prediction mode deciding apparatus 100 illustrated in FIG. 1.

Consequently, the camera 600 can use a storage area of the DRAM 618 or the recording media 633 more efficiently in a higher speed.

In addition, a decoding method performed by the video decoding apparatus 150 illustrated in FIG. 5 may be employed to a decoding process performed by the controller 621. Likewise, an encoding method performed by the video prediction mode deciding apparatus 100 illustrated in FIG. 1 may also be employed to an encoding process performed by the controller 621.

In addition, the picture data photographed by the camera 600 may be a motion picture and/or a still picture.

Here, the video prediction mode deciding apparatus 100 illustrated in FIG. 1 and the video encoding apparatus 150 illustrated in FIG. 1 may also be employed to devices or systems other than the aforementioned apparatuses.

Although the present inventive concept has been particularly shown and described with reference to exemplary embodiments thereof, it will be understood by those skilled in the art that various changes in form and details may be made therein without departing from the spirit and scope of the present inventive concept as defined by the following claims. Therefore, it may be understood that the present embodiments be considered in all respects as illustrative of the present inventive concept and should not to be construed as being limited to the specific embodiments disclosed herein. In addition, the present inventive concept can also be embodied as a computer readable code on a computer readable recording medium. The computer readable recording medium is any data storage device that can store data which can be thereafter read by a computer system. Examples of the computer readable recording medium include a read-only memory (ROM), a random-access memory (RAM), CD-ROMs, magnetic tapes, floppy disks, optical data storage devices, and carrier waves (for example, transmission via the Internet). The computer readable recording medium can also be distributed over network coupled computer systems and thus, the computer readable code is stored and executed in a distributed fashion.

In concluding the detailed description, those skilled in the art will appreciate that many variations and modifications can be made without substantially departing from the principles of the present inventive concept. Therefore, the disclosed embodiments of the inventive concept are used in a generic and descriptive sense only and not for purposes of limitation.

What is claimed is:

1. A method of deciding a video prediction mode for video encoding, the method comprising:
   selecting first prediction modes among n prediction modes used for video encoding using a first cost function, wherein n is a positive integer; and
   selecting a final prediction mode among the first prediction modes using a second cost function different from the first cost function,
   wherein the first cost function includes a sum of absolute transformed difference (SATD) operation,
   wherein the second cost function includes a sum of a first term and a second term, the first term comprising a sum of squared difference (SSD) operation multiplied by a first parameter and the second term comprising a SATD operation multiplied by a second parameter.

2. The method of claim 1, wherein the first cost function is a sum of i) an SATD operation performed on a result of using a given one of the n prediction modes and ii) an index value associated with the given prediction mode.

3. The method of claim 1, wherein the second cost function is a sum of i) the first parameter multiplied by an SSD operation performed on a result of using a given one of the first prediction modes, ii) an SATD operation performed on a result of using the given prediction mode, iii) and an index value associated with the given prediction mode.

4. The method of claim 1,
   wherein the parameters are determined by setting the second function to be substantially the same as a sum of an SSD operation performed on a result of using a given one of the first prediction modes and a Lagrangian coefficient associated with the given prediction mode times a bit rate.

5. The method of claim 1, wherein the selecting of the first prediction modes comprises obtaining first cost function values of the n prediction modes and selecting k prediction modes having small first cost function values among the n prediction modes as the first prediction modes, wherein k is a positive integer smaller than or equal to n.

6. The method of claim 1, wherein the selecting of the first prediction modes comprises obtaining a smallest prediction mode having a smallest first cost function value and selecting the k prediction modes having first cost function values within a critical range from the first cost function value of the smallest prediction mode value as the first prediction modes.

7. The method of claim 5, wherein the selecting of the final prediction mode comprises obtaining second cost function values of the first prediction modes and selecting a first prediction mode having a smallest second cost function value among the first prediction modes as the final prediction mode.

8. The method of claim 1, wherein the n prediction modes includes an intra prediction mode or an inter prediction mode.

9. A system on chip (SOC) comprising:
   an encoder configured to encode an input video signal and to generate a bit stream; and
   an application specific integrated circuit (ASIC) configured to decide a final prediction mode used by the encoder,
   wherein the final prediction mode is decided using a first cost function including a sum of absolute transformed difference (SATD) operation and a second cost function including a sum of a first term and a second term, the first term comprising a sum of squared difference (SSD) operation multiplied by a first parameter, and the second term comprising a second parameter multiplied by a SATD operation,
   wherein the ASIC includes:
      a first ASIC configured to select first prediction modes among n prediction modes used for video encoding using the first cost function; and
      a second ASIC final configured to select the final prediction mode among the first prediction modes using the second cost function, wherein n is a positive integer.

10. The SOC of claim 9, wherein the final prediction mode includes an intra prediction mode or an inter prediction mode.

11. The SOC of claim 9, wherein the first cost function is a sum of i) an SATD operation performed on a result of using a given one of the n prediction modes and ii) an index value associated with the given prediction mode.

12. The SOC of claim 9, wherein the second cost function is a sum of i) the first parameter multiplied by an SSD operation performed on a result of using a given one of the first prediction modes, ii) an SATD operation performed on a result of using the given prediction mode, iii) and an index value associated with the given prediction mode.

13. The SOC of claim 9, wherein the first ASIC obtains first cost function values of the n prediction modes and selects k prediction modes having small first cost function values among the n prediction modes as the first prediction modes, wherein k is a positive integer smaller than or equal to n.

14. The SOC of claim 13, wherein the second ASIC obtains the second cost function values of the first prediction modes and selects a first prediction mode having a smallest second cost function value as the final prediction mode.

15. The SOC of claim 9, wherein the parameters are determined by setting the second function to be substantially the same as a sum of an SSD operation performed on a result of using a given one of the first prediction modes and a Lagrangian coefficient associated with the given prediction mode times a bit rate.

16. An apparatus configured to decide a video prediction mode for video encoding comprising:
   a first application specific integrated circuit (ASIC) configured to select first prediction modes among n prediction modes used for video encoding using a first cost function; and
   a second ASIC configured to select a final prediction mode among the first prediction modes using a second cost function,
   wherein the first cost function includes a sum of absolute transformed difference (SATD) operation,
   wherein the second cost function includes a sum of a first term and a second term, the first term comprising a sum of squared difference (SSD) operation multiplied by a first parameter, and the second term comprising a second a SATD operation multiplied by a second parameter, and
   wherein n is a positive integer.

17. The apparatus of claim 16, wherein the first cost function is a sum of i) an SATD operation performed on a result of using a given one of the n prediction modes and ii) an index value associated with the given prediction mode.

18. The apparatus of claim 16, wherein the second cost function is a sum of i) the first parameter multiplied by an SSD operation performed on a result of using a given one of the first prediction modes, ii) an SATD operation performed on a result of using the given prediction mode, iii) and an index value associated with the given prediction mode.

19. The apparatus of claim 16, wherein the first ASIC obtains first cost function values of the n prediction modes and selects k prediction modes having small first cost function values among the n prediction modes as the first prediction modes, wherein k is a positive integer smaller than or equal to n.

20. The apparatus of claim 19, wherein the second ASIC obtains the second cost function values of the first prediction modes and selects a first prediction mode having a smallest second cost function value as the final prediction mode.

21. The apparatus of claim 16, wherein the parameters are determined by setting the second function to be substantially the same as a sum of an SSD operation performed on a result of using a given one of the first prediction modes and a Lagrangian coefficient associated with the given prediction mode times a bit rate.

* * * * *